United States Patent [19]
Edwards

[11] 3,772,596
[45] Nov. 13, 1973

[54] DATA MESSAGE REPEATER SYSTEM

[75] Inventor: Carson Penrod Edwards, Boulder, Colo.

[73] Assignee: Sierra Research Corporation, Buffalo, N.Y.

[22] Filed: Oct. 2, 1972

[21] Appl. No.: 294,302

[52] U.S. Cl. .......................... 325/13, 325/2, 325/6, 325/7, 325/8, 325/10
[51] Int. Cl. .......................... H04b 7/18
[58] Field of Search .......................... 325/2, 6, 7, 8, 10, 325/13, 21, 22; 179/2 DP, 15 AD; 340/167

[56] References Cited

UNITED STATES PATENTS 3,646,441 2/1972 Magnuski .......................... 325/13

*Primary Examiner*—Albert J. Mayer
*Attorney*—Arthur E. Dowell, Jr. et al.

[57] ABSTRACT

A repeater system for receiving data messages from a transmission medium, the messages being formatted to include a start character, one or more address code characters and an end-of-transmission character; the system converting the message into binary serial form and demodulating the data and storing it in a register, and then subsequently reconstituting it into a newly formatted message and retransmitting it to another station with an appropriate new address code, the illustrative embodiment using FSK transmitters and receivers operating on the same frequency; and the system being especially adapted for automatic unattended operation in which a power supply is recharged by solar cells and is turned "on" and "off" by logic means in such a way as to conserve power; and said system including means for locally monitoring the data passing through a repeater.

7 Claims, 3 Drawing Figures

DATA MESSAGE REPEATER SYSTEM

This invention relates to data communication systems, and more particularly to message transmitting and receiving systems including data demodulator and reformatter means for the purpose of repeating such data with minimal degradation thereof.

Repeater stations according to the known prior art can be divided into two general types, those which use two different frequencies on which to receive incoming messages and retransmit them, and those using the same frequency on which to receive and then to subsequently retransmit the message. The present disclosure is of the single-frequency type and employs this approach to obtain advantages, such as the conservation of frequencies in the spectrum available for a certain class of radio operation and lack of interference caused by a transmitter with its associated receiver in the same repeater unit, even though they are on somewhat different frequencies, since in the present system they operate at different times. Such advantages are already described in the prior art, such as Magnuski U.S. Pat. No. 3,646,441, which also describes the advantages acrueing from demodulating formatted data to recover it in series binary form and then reconstituting a new message format to be retransmitted from that repeater station, whereby there is little or no degradation of the message introduced by each repeater.

The present invention is directed toward an improved automatic unattended repeater especially well adapter for use at a remote location to serve as a link in a chain of repeaters bringing out digital data from remote often-mountainous regions, for instance, such as water level data from river-stage gauges in valleys winding between mountain ridges, or such as snow-depth and water content data taken from snow-pillow transducers to aid in predicting spring run-offs. The transmission paths for such data are often marginal in practical installations from one repeater to another so that multipath transmission problems tend to degrade the data, thereby making the present approach of regenerating the message at each repeater attractive. Such regeneration takes enough time to accomplish so that by the time the message is retransmitted, perhaps one or two seconds later, any multipath or reflected signals will have died out. Moreover, because the repeaters are often required to operate in locations where they are inaccessible for months at a time, they must be capable of sustained operation using solar cells to recharge their batteries.

It is therefore a major object of this invention to provide a repeater system organized to conserve power by having most of the system turned "off" except when actually needed to process and transmit a specific message, and having only a low current-drain receiver continuously operative while the remainder of the repeater is quiescent.

More particularly, it is the object of this invention to provide a repeater which operates in response to messages in a predetermined format, for example including a start character (STX), followed by one or more address-code characters serving to provide recognition to repeaters which are similarly encoded to be turned "on" by a predetermined code and/or turned "off" by any non-recognized address code, followed by multiple data characters constituting the main content of the message, followed by an end of transmission character (EOT). The repeater's receiver operates continuously except when the repeater is transmitting, and when a message is received the receiver's squelch is broken and it turns "on" a power supply, thereby rendering operative such modem, demodulator and code recognition circuitry as is needed to determine whether the received address code is the one to which this repeater is responsive. If not, the power supply is turned "off" again. If the code is recognized the message is fully demodulated to restore it to serial binary form, reformatted and retransmitted, the EOT character when retransmitted turning "off" the power supply again, thereby disabling every component in the system except the receiver.

A further object of the invention is to provide a repeater system in which, in order to conserve power, the various components are turned "on" only as needed, the receiver squelch in response to a received signal turning "on" those components required to demodulate the initial portion of a message and to determine whether the address code is recognized. Then, if so, after demodulation and storage of the message the EOT character turns "on" the message reformatter and the transmitter, and the passage therethrough of the EOT character finally turning "off" all units except the receiver.

Another object of this invention is to provide a system which can be made to cooperate easily with present methods of relaying transducer data from remote places, the data usually being transmitted to the repeater by two-tone FSK RF transmissions and then being converted within the repeater to ASCII binary form. The present system therefore provides suitable MODEM means between the transmitter/receiver means and the binary data processing components used to demodulate and then to reconstitute the message format. Many of the prior art systems for relaying data from one repeater to another use code tones to address the message to a particular repeater station, but since there are only a few usable tones, the number of uniquely addressable repeaters is rather limited. The present system uses binary multiple-bit address characters, each character having perhaps seven or more bits, thereby providing a large number of unique codes. Moreover, since the message is fully demodulated and then reformatted by each repeater, one repeater can strip its own address code from an incoming message and then substitute into that message the address code of the next repeater before retransmitting it, whereby each successive repeater is specifically and uniquely addressed so that no repeater is in danger of receiving a message intended for another, perhaps due to unusual transmission path characteristics. In prior art systems where each message is retransmitted with the same address character as received, the above phenomenon is a likely occurrence.

Another object of this invention is to provide means at a repeater for monitoring the messages as they are received, this means including a teletypewriter and a system for slowing the demodulated data which arrives at a 1,200 baud rate, for instance, in the present illustrative example, and is then slowed to 110 baud for operating the teletypewriter, this being accomplished by clocking the data into a register at the higher rate and then clocking it out to the teletypewriter at the lower rate. This monitoring feature is useful for system-checking at the various relays as well as for data extraction therefrom by a party operating in the field.

Other objects and advantages of the invention will become apparent during the following discussion of the drawings, wherein.

Figure 1:
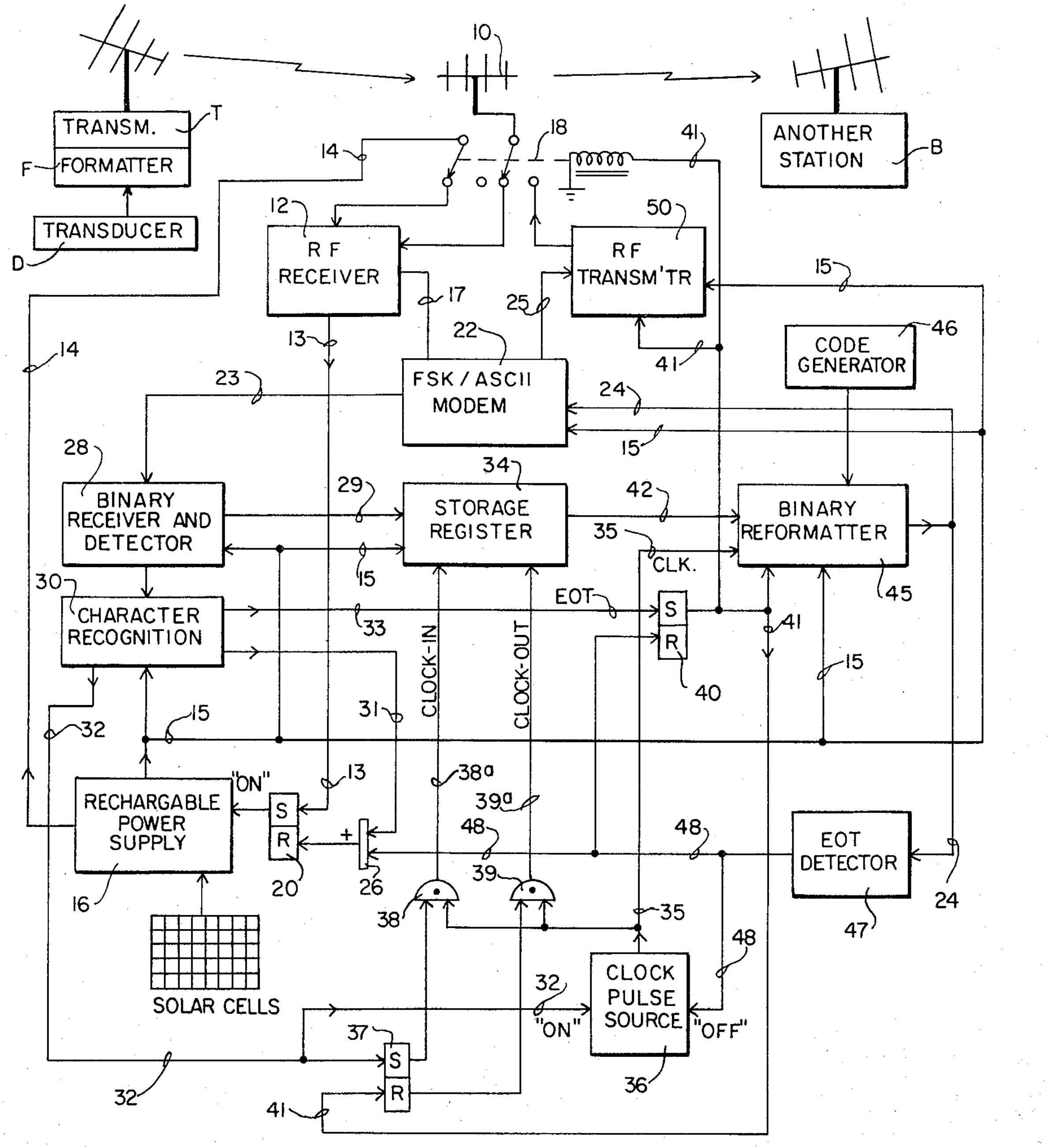
FIG. 1 is a block diagram showing a message communication system including a repeater according to the present invention.
Figure 2:
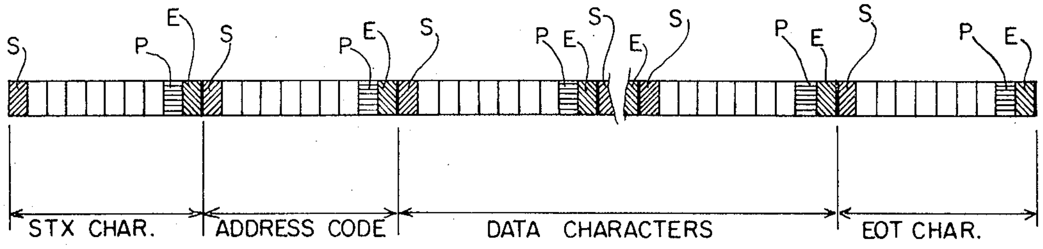
FIG. 2 is a block diagram showing an exemplary message format.

Referring now to the drawings, FIG. 1 shows a communication system in which data taken from a transducer D is formatted into a message of the type shown in FIG. 2 by a formatter F and transmitted by an FSK transmitter T to the repeater shown in more detail in FIG. 1. Although the medium over which the message is transmitted can be wires, the present system will be described with reference to radio-transmitted messages using antennas, preferably directional, to radiate and receive the messages.

FIG. 2 shows a tyical message composed in serial binary format and including in each character ten bit positions, each character commencing with a synchronizing start bit S and ending with a stop bit E. In each of the characters, this leaves seven bits to identify the character plus a parity bit P, even parity being used in the practical equipment manufactured according to this disclosure. These characters comprise an STX character, at least one address character, a series of data characters, and an EOT character.

The message arriving from the transmitter T at the antenna 10, FIG. 1, is of the above sequence but is received as FSK tones entering the receiver 12, which is powered "on" by its own separate power supply line 14 from the power supply 16 so that the receiver is always "on," except when the antenna 10 and power supply 16 are disconnected therefrom by the relay 18 while the transmitter 50 is actually transmitting. It is to be understood that the relay 18, though schematically shown as an electromagnetic device, may be replaced with solid state switching means. The power supply 16 for automatic unattended operation comprises rechargable battery means charged by an array of solar cells at an average rate higher than the rate of stand-by current drain by the receiver plus intermittent data handling and retransmitting requirements.

The receiver 12 includes an internal squelch circuit that is responsive to the reception of a signal not only to enable the normally squelched circuits of the receiver but also to put out a control signal on the wire 13 to set a flipflop 20 and turn on another portion of the power supply 16, i.e. the portion not already supplying current to the receiver via wire 14, to deliver power on wire 15. This power enables the FSK/ASCII MODEM 22 which receives the message characters as tones on wire 17 and delivers serial binary bits on wire 23 to the binary receiver 28 which detects and desynchronizes the data to separate the characters from their synchronizing bits. A character recognition circuit 30 checks the address character in the message, to see if it coincides with an address character which has been preentered into the recognition circuit 30. If so, the latter has an output on wire 32 but it has no output on wire 31. Conversely, if the incoming address code character does not check, the recognition circuit 30 delivers an output on wire 31 through OR gate 26 to reset the flipflop 20 and turn "off" the output from the power supply 16 via wire 15 to all circuits except to the receiver, so that the repeater then becomes quiescent again.

Assuming the address code did check in the recognition circuit 30, then the power on wire 15 will thereafter be enabling the register 34 which has sufficient length to store the data characters in anticipated messages as well as the EOT character at the end thereof. The register 34 is typically of the static shift register type and preferably comprises a recently developed improvement thereof which is manufactured by Fairchild and referred to as a First-In-First-Out "FIFO" register, in which the input data stacks immediately at the output stages so that the register doesn't have to be filled via the input before output can be taken from it. The input to this register 34 is clocked by a clock pulse source 36 putting out pulses on wire 35 through the gate 38 to the Clock-Data-In wire **38*a* to the register 34, the pulse source 36 being turned "on" by output from the recognition circuit 30 on wire 32 when the incoming address code matches the code pre-entered in the recognition circuit 30. Moreover, output on the wire 32 sets a flipflop 37 to enable the AND gate 38 controlling the flow of clock pulses to clock data into the register 34 as distinguished from out of it. Therefore, as the data characters are detected and delivered on the wire 29, their bits are clocked into the register 34** for storage.

The character recognition circuit 30 also has the capability of recognizing an EOT character, and when the latter passed therethrough it delivers an output on wire 33 to set a flipflop 40 whose output on wire 41 enables the Binary Reformatter 45 and the RF transmitter 50, and also closes the relay 18 and resets the flipflop 37, disabling the date 38 and enabling the AND gate 39 to clock data out of the register 34 via wire 42 in response to the clock pulses on the wire **39*a* from source 36. It is also noted that two different rates of clock pulses could be used instead of the one from source 36, in cases where it is desirable to clock data into and out of the register 34** at respectively different rates.

The data clocked from the register 34 into the Reformatter 45 is reconstituted into the format shown in FIG. 2 including insertion of a new synchronizing bits S and E around each of the characters and also including a new address character generated by the code generator 46 and identifying the next station or repeater to which the data is to be retransmitted. Thus, the outgoing message differs from the received message only to the extent that the address code character, or characters may be different. As these characters are reformatted by the circuit 45, they are sent out of the Reformatter 45 in serial binary form on the wire 24 and pass through the modem 22 so that they then appear at the wire 25 as FSK tones. They enter the transmitter 50 frequency shift modulated and are sent out on its carrier through the relay 18 and into the antenna 10 for radiation to the next station B to which the message is addressed.

As the message is read out serially from the Reformatter 45 on wire 24, it is monitored by an EOT detector 47, and when this detector detects the passage of the EOT character of the message being transmitted, it delivers a slightly delayed output on wire 48 which, when the EOT character has been transmitted, resets the flipflop 40 thereby disabling the Reformatter 45 and transmitter 50 and releasing the relay 18. The outut on wire 48 also disables the clock output 36, and passes through the OR gate 26 to reset the flipflop 20, thereby returning the repeater to quiescent stand-by condition.

Figure 3:
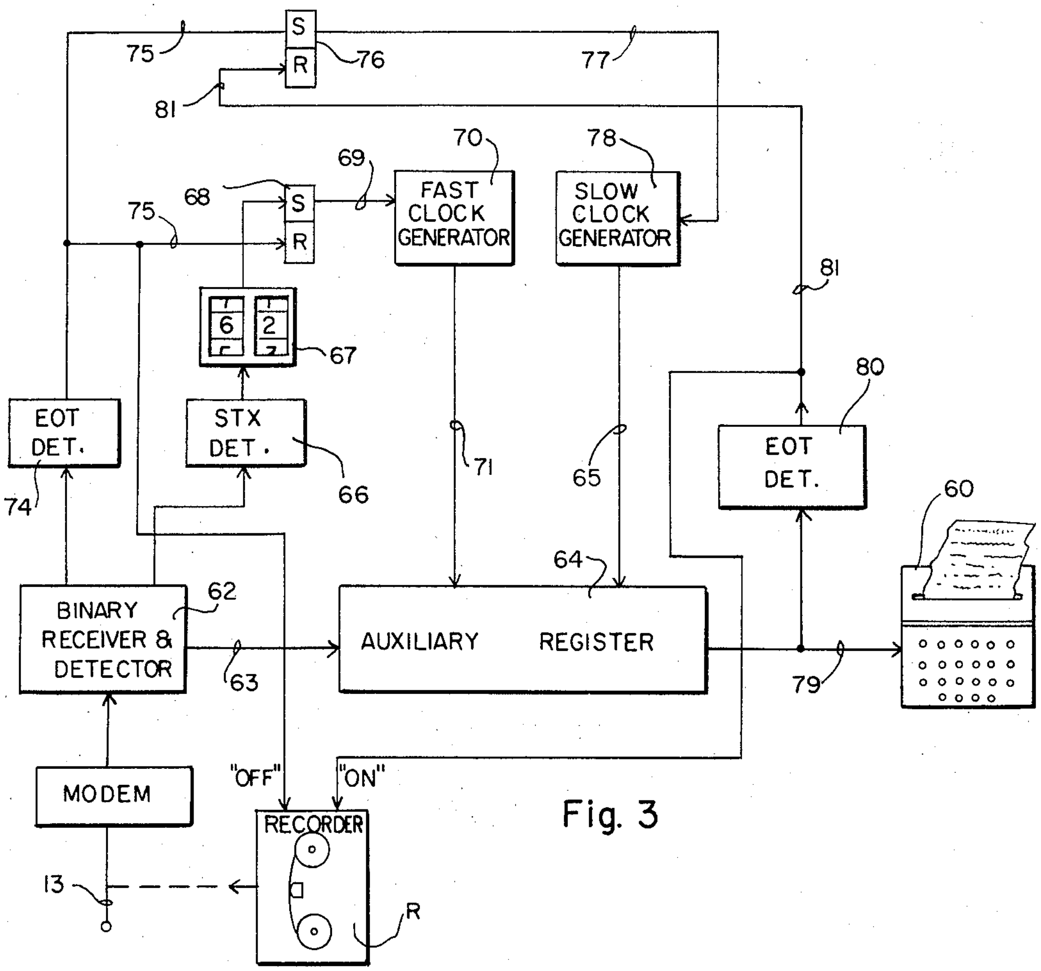
FIG. 3 is a block diagram showing an addition to the system as shown in FIG. 1 for monitoring messages passing through that repeater.

FIG. 3 shows additional circuitry which can be coupled to the repeater circuit of FIG. 1 for adding a monitor feature to the repeater so that messages passing therethrough can be captured and presented to an observer, for instance, using a teletypewriter 60 as the readout. For this purpose, the monitor has a modem 61 which can be connected to accept the output on wire 13 of the receiver 12, FIG. 1, and convert it to serial binary form. This output is detected in a binary data receiver and detector 62 and is made available for storage in an auxiliary register means 64 via wire 63, the register 64 being similar to the register 34, FIG. 1. An STX character detector 66 coupled to the binary receiver and detector 62 senses the incoming STX character at the start of a newly received message, and sets a flipflop 68 to enable a fast-clock pulse generator 70. This generator puts out pulses on wire 71 at 1,200 Baud, the data bit rate in the present illustrative communication system, and these pulses on wire 71 are entered into the Data-In clock terminal of the register 64 so that it will accept and store the data on wire 63 which is to be clocked into it by the 1,200 Baud clock pulses. Naturally, if the address character recognition circuit 30 in FIG. 1 finds that the address character of the incoming message does not check and therefore delivers an output on wire 31, no data will arrive at the data input of the modem 61 since the receiver will have been squelched off again, right away. However, assuming that the address code checked, then the data characters are read into and stored in the register 64. An EOT detector 74 eventually detects the end of the incoming message and delivers an output on wire 75 which resets the flipflop 68. In addition, the output on wire 75 of the EOT detector 74 sets another flipflop 76 which delivers output on wire 77 to enable the slow-clock pulse generator 78 to deliver clock pulses at 110 Baud to the clock terminal of the Register 64. This slow clock rate is the rate used by the teletypewriter, and is a standard for such instruments. The outut pulses from the clock generator 78 are delivered to the Data-Out clock terminal 65 of register 64 which then begins to read out its stored data characters on the wire 79 to the teletypewriter to be written out for monitoring purposes. Since the repeater is quiescent most of the time, there is plenty of time to read out a stored message at the slow-Baud rate without interference with a subsequent incoming message to the repeater. Alternatively, a thumb-wheel presettable counter 67 can be inserted im the output lead from the STX detector 66 so that the system will print-out only every Nth message passing through the repeater, thereby avoiding excessive redundancy where data tends to repeat without much change over a period of time.

Finally, when the stored message has been read out to the final character, being an EOT character, it will be detected by an EOT detector 80 which will then deliver an output on wire 81 to reset the flipflop 76, returning the monitoring system to stand-by condition.

The monitoring system of FIG. 3 can either comprise a permanently incorporated part of the repeater shown in FIG. 1 or else it can be a stand-alone unit attachable thereto or to another similar repeater unit. One common way of using monitoring systems of this type is to record the incoming detected FSK signals on a recorder unit R, and then later monitor them by having the output of the EOT detector 80 turn "on" the recorder unit R when it has taken a preceeding message therefrom, and subsequently having the EOT detector 76 turn it back "off" again, as shown in FIG. 3.

This invention is not to be limited to the exact embodiments shown in the drawings, for obviously changes may be made within the scope of the following claims.

I claim:

1. A digital data repeater for receiving a message transmitted via a signal propagating medium and for retransmitting it to another station at a subsequent time substantially without degradation, each message including data characters preceded by a start character and an encoded address character and concluded by an end-of-transmission character, comprising:

a. a power supply;

b. a transmitter for transmitting messages via said medium;

c. a relay receiver operative except when said transmitter is operative to receive messages from said medium and responsive thereto to turn "on" said power supply to the rest of the repeater;

d. a binary data receiver and demodulator coupled to accept received messages and operative to recover characters therefrom as binary data;

e. character recognition means coupled to said demodulator and responsive to demodulation of an address character other than a predetermined desired address character to turn "off" said power supply, and including means to detect an end-of-transmission character;

f. a character storage register operative when the power supply is "on" and capable of accepting and storing the demodulated characters recovered as data by the binary demodulator;

g. a binary data reformatter coupled between said register and said transmitter;

h. means responsive to detection of an end-of-transmission character by the character recognition means to turn "on" the transmitter and the binary formatter and to actuate said storage register to read out said data; and i. an end-of-message detector coupled to said formatter and responsive to an end-of-message character read-out therefrom to turn "off" the power supply.

2. The repeater as set forth in claim 2, wherein said power supply is a rechargable supply, and solar cell means coupled to said supply to recharge it.

3. The repeater as set forth in claim 1, wherein said power supply has two separate power outputs, one output being selectively controllable between said turned "on" and turned "off" conditions and being connected to supply power to said binary receiver and demodulator, said character recognition means, said detector, said storage register, said binary reformatter and said transmitter; and the other output being connected to supply power to said receiver.

4. The repeater as set forth in claim 1, wherein said storage register, after recognition of said predetermined address code by said recognition means, storing the data characters and the end-of-tranmission character; a code generator for generating the address code of said another station; and said binary reformatter reformatting the message to be transmitted using said generated address code.

5. The repeater as set forth in claim 1, wherein said transmitter and receiver and frequency-shift keyed; and modem means coupled between the transmitter and the binary formatter on the one hand, and the receiver and the binary receiver and demodulator on the other hand, for converting between frequency-shift modulation and serial binary form.

6. In the repeater as set forth in claim 1, means for monitoring messages passing through the repeater at a first faster bit rate by reading out the data to a display device operating at a second slower bit rate, comprising auxiliary data storage and readout register means; binary receiver means to detect binary data received by the relay receiver; fast clock pulse generator means; means responsive to a detected start character to enable said fast generator means to deliver clock pulses to said auxiliary register means and to enable the register means to store detected digital data; slow clock pulse generator means; means responsive to a detected end-of-transmission character to disable said fast-generator means and to enable said slow-generator means to deliver slow clock pulses to said auxiliary register means and to enable the register means to read out the data stored therein to said display device; and means responsive to an end-of-transmission character when read out from said auxiliary register means to disable said slow-generator means and to disable said auxiliary register means.

7. The repeater as set forth in claim 6, wherein said monitoring means includes means coupled to said character recognition means of the repeater and responsive to detection thereby of an address character other than said predetermined desired address character to disable said clock generator means and said auxiliary register means.

* * * * *